United States Patent
Desselle et al.

(10) Patent No.: US 8,533,845 B2
(45) Date of Patent: Sep. 10, 2013

(54) METHOD AND APPARATUS FOR CONTROLLING OPERATING SYSTEM ACCESS TO CONFIGURATION SETTINGS

(75) Inventors: B. Dalvis Desselle, Houston, TX (US); Gregory P. Ziarnik, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2914 days.

(21) Appl. No.: 11/058,341

(22) Filed: Feb. 15, 2005

(65) Prior Publication Data

US 2006/0184794 A1 Aug. 17, 2006

(51) Int. Cl.
*G06F 7/04* (2006.01)

(52) U.S. Cl.
USPC ............ 726/26; 726/2; 726/27; 713/164; 713/166

(58) Field of Classification Search
USPC .......................... 713/166; 726/26
See application file for complete search history.

(56) References Cited

U.S. PATENT DOCUMENTS

| | | | |
|---|---|---|---|
| 5,835,761 A * | 11/1998 | Ishii et al. | 713/100 |
| 6,065,067 A * | 5/2000 | Hobson et al. | 710/8 |
| 6,510,099 B1 | 1/2003 | Wilcox et al. | |
| 6,598,169 B1 * | 7/2003 | Warwick et al. | 713/320 |
| 6,748,461 B2 | 6/2004 | Oshins et al. | |
| 6,763,472 B2 | 7/2004 | Warwick et al. | |
| 6,820,164 B2 * | 11/2004 | Holm et al. | 710/312 |
| 7,032,053 B2 * | 4/2006 | Himmel et al. | 710/302 |
| 7,234,054 B2 * | 6/2007 | Rothman et al. | 713/2 |
| 7,278,143 B2 * | 10/2007 | Muhlestein et al. | 719/310 |
| 7,676,815 B2 * | 3/2010 | Muhlestein et al. | 719/328 |
| 2005/0060575 A1 * | 3/2005 | Trethewey et al. | 713/201 |
| 2005/0257272 A1 * | 11/2005 | Nakao | 726/26 |
| 2006/0156035 A1 * | 7/2006 | Tran et al. | 713/193 |
| 2008/0016501 A1 * | 1/2008 | Muhlestein et al. | 717/136 |

OTHER PUBLICATIONS

"Windows Instrumentation: WMI and ACPI," Microsoft Corporation, Dec. 4, 2001, pp. 1-12.*
"Windows Instrumentation: WMI and ACPI", Microsoft Corporation (Dec. 4, 2001).

* cited by examiner

*Primary Examiner* — Luu Pham (57) ABSTRACT

A method of operating a computer includes receiving an operating system request to access configuration settings. The request is executed in accordance with authorization determined by at least one operating system access control parameter.

2 Claims, 9 Drawing Sheets

METHOD AND APPARATUS FOR CONTROLLING OPERATING SYSTEM ACCESS TO CONFIGURATION SETTINGS

TECHNICAL FIELD

This invention relates to the field of computer security. In particular, this invention is drawn to controlling operating system access to configuration settings.

BACKGROUND

Computer systems typically include hardware components such as processors, power supplies, nonvolatile storage, peripheral devices, etc. Some of the components have configuration settings embodied as firmware code or data that can be modified by the user to tailor the component configuration for the particular system it is installed within.

For many computer systems, a time limited window of opportunity for changing the configuration settings becomes available after a Power On Self Test (POST) and before initiation of an operating system boot. Unless the user issues a keyboard key sequence during this window of opportunity to launch the configuration program, the computer will proceed to boot the operating system.

The configuration program allows the user to set various parameters stored within a nonvolatile memory. For example, power management options, peripheral device boot sequence, and numerous other settings may be modified using the configuration program. Typically password protection is available for the configuration program. When enabled, authentication by password is required before the user is able to make any value or option changes with the configuration program. This also enables a division of responsibility for modification of firmware configuration settings versus installation/removal/configuration of application programs.

At least one operating system vendor has provided infrastructure to permit changing the parameters through the operating system (i.e., in the post-OS boot execution environment). Privileges required for making such changes, however, are controlled exclusively by the operating system. The security offered by password protection of the configuration program is thus effectively bypassed.

This exposes the computer system firmware to the possibility of being modified by any program as long as the user (or program) has the appropriate privilege level as determined by the operating system vendor. The firmware is exposed to unauthorized modification as a result of malicious programs that could utilize security flaws in the operating system. Modification of the configuration parameters can cause the computer to behave in an undesirable manner resulting in physical harm to the computer system, loss or destruction of data, or rendering the computer unable to boot among other maladies.

SUMMARY OF THE INVENTION

In view of limitations of known systems and methods, various methods and apparatus for operating a computer are described.

One method of operating a computer includes receiving an operating system request to access configuration settings. The request is executed in accordance with authorization determined by at least one operating system access control parameter.

Another method of operating a computer includes invoking a configuration program to access configuration settings during a pre-operating system boot phase of the computer boot process. A value of an operating system access control parameter is selected using the configuration program. Operating system access to the configuration settings is limited in accordance with the selected value of the operating system access control parameter.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
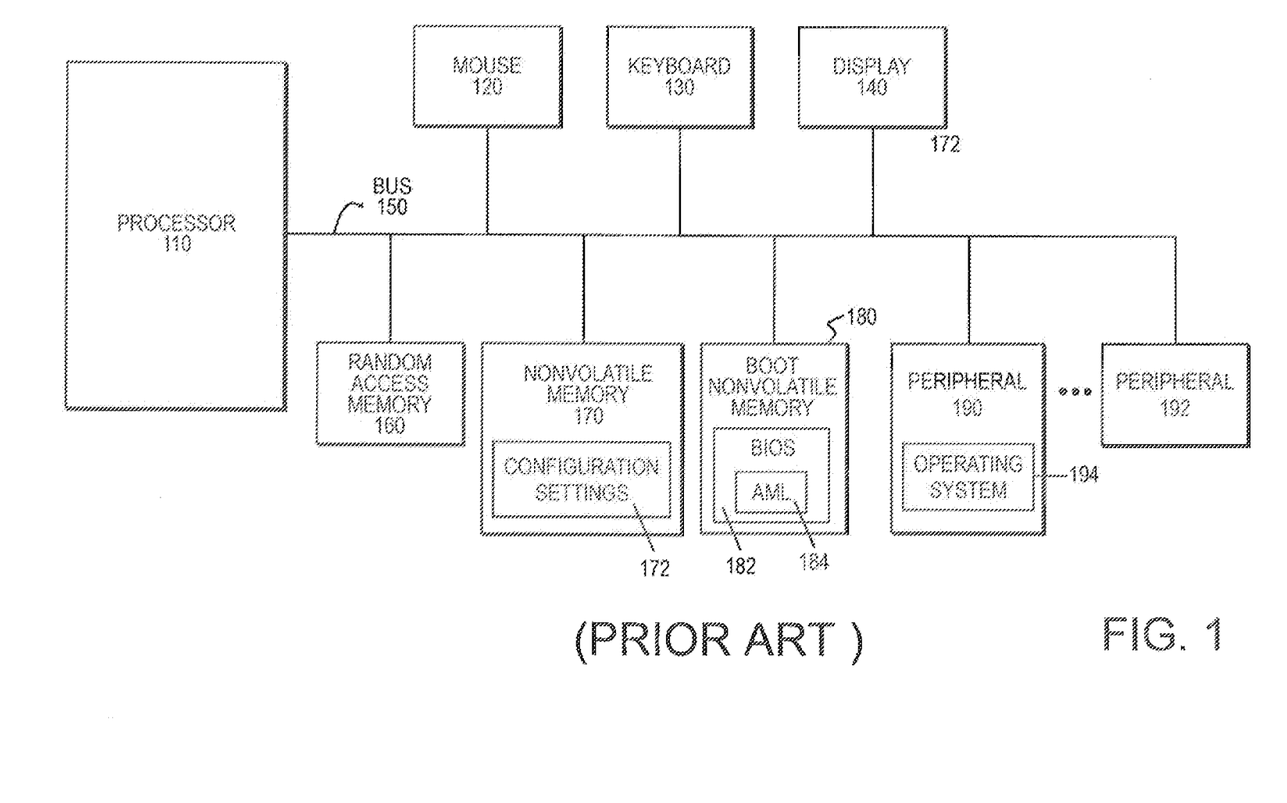
FIG. 1 illustrates one embodiment of a computer.

FIG. 1 illustrates one embodiment of a computer system architecture. Computer 100 includes processor 110. Input devices such as mouse 120 and keyboard 130 permit the user to input data to client computer 100. Information generated by the processor is provided to an output device such as display 140. Computer 100 includes random access memory (RAM) 160 used by the processor during program execution.

RAM 160 is typically a volatile memory and does not retain its contents once power is removed from the computer system. Computer 100 includes nonvolatile memory 170 for storing configuration settings 172 even when the computer is powered down. Often parameter information that identifies specific features of the input/output devices is stored in nonvolatile memory 170. For example, parameter information might describe the number of disk drives, disk drive type, number of heads, tracks, amount of system RAM, etc. as well as the sequence in which peripherals are accessed when attempting to boot the computer (peripheral boot sequence). Typically, nonvolatile memory 170 is a semiconductor-based memory. Various types of nonvolatile media including electrically erasable programmable read only memory (EEPROM), flash electrically re-writable memory, and battery-backed complementary metal oxide semiconductor (CMOS) are available.

The computer also has one or more peripherals 190, 192 such as a floppy drive, a hard drive, or an optical drive that supports nonvolatile storage. Compact disks (CDs) and Digital Video Disks (DVDs) are examples of media used with optical drives.

Mouse 120, keyboard 130, display 140, RAM 160, nonvolatile memory 170, and boot nonvolatile memory 180 are communicatively coupled to processor 110 through one or more buses such as bus 150.

Initialization of the computer system is performed upon power-up of the computer system or hardware or software reset operations. In one approach, the processor is designed to read a pre-determined memory location when the processor is reset or powered up. The pre-determined memory location stores a pointer or an address that directs the processor to the beginning of the bootstrap routines. The pointer or address is referred to as a boot vector. For some types of resets (e.g., a "hard" or "cold" reset), the boot vector is always set to a value determined at the time of manufacture of the processor. Other types of resets (e.g., "soft" or "warm" reset) permit an alternative boot vector to be used.

For hard resets, the boot vector typically points to an address in the boot nonvolatile memory 180. For soft resets, however, the boot vector may point to a RAM location. The boot nonvolatile memory stores the bootstrap loader and typically stores other initialization routines such as power on system test (POST). Although occasionally referred to as a boot read only memory (ROM), the boot nonvolatile memory is typically embodied at least partially as a re-writable nonvolatile memory to permit updates. For example, in one embodiment the boot nonvolatile memory comprises a semiconductor flash electrically re-writable memory.

The boot nonvolatile memory may include routines for communicating with input/output devices in the computer system. In some computer systems these routines are collectively referred to as the Basic Input Output System (BIOS) 182. The BIOS provides a common interface so that software executing on the processor can communicate with input/output devices such as the keyboard, mouse, nonvolatile mass memory storage device, and other peripheral devices. The configuration program used for accessing the configuration settings prior to the boot of the operating system is frequently referred to as the BIOS setup or BIOS configuration program. The configuration settings altered by the BIOS configuration program are similarly also referred to as the BIOS settings. In various embodiments, the configuration program is typically part of the BIOS 182 or at least stored within the same nonvolatile memory 180 as the BIOS.

The BIOS typically permits the user to boot an operating system from any one of the floppy drive, hard drive, optical drive, or other peripheral device 190. The computer follows the peripheral boot sequence in an attempt to boot from the peripheral devices. Proceeding in boot sequence order, the computer attempts to boot from the first device in the boot sequence that is bootable. The computer's operating system 194 is stored on or accessible by the peripheral device 190 from which the computer system boots.

The Advanced Configuration and Power Interface (ACPI) specification is an open industry specification establishing industry standards for computer operating system-directed configuration and power management. ACPI-compliant hardware has features to permit the operating system to co-ordinate power management operations such as disk drive spin down and display power down. The features of ACPI-compliant hardware are controlled through ACPI Software Language (ASL) control methods compiled into ACPI Machine Language (AML 184) code that is stored as part of the system Basic Input/Output System (BIOS). The ASL/AML control methods are interpreted and executed by a driver within the ACPI system. Further information about the ACPI specification is available in the Advanced Configuration Power Interface Specification Rev. 3.0 (Sep. 2, 2004) promulgated by Hewlett-Packard Corporation, Intel Corporation, Microsoft Corporation, Phoenix Technologies, Ltd., and Toshiba Corporation.

The functionality provided by the ACPI specification has largely been limited to power management by the operating system because the ACPI driver is a kernel mode driver that is not directly accessible by user mode applications. "Kernel mode" refers to processing handled at the most privileged level of the operating system.

One approach for gaining access to the kernel mode of the ACPI creates 1) a private kernel mode driver capable of interfacing with the kernel mode ACPI driver, and 2) an interface between the private kernel mode driver and the user mode application. One disadvantage of this approach is that each user application requires a private kernel mode driver and interface file specific to that application. This approach tends to increase file "clutter" and incurs redundant development efforts and costs across different vendors. Another disadvantage of this approach is that much of the functionality performed by the private kernel mode drivers is the same. As the number of private kernel mode driver increases, they tend to consume computer system resources to redundantly perform the same tasks.

A mapping system within the operating system has been promulgated as part of a Web Based Enterprise Management (WBEM) industry initiative to provide a common architecture for exposing the features of the ACPI-compliant hardware to user applications. The mapping system permits instrumented devices to provide information and notification to user mode applications using a common data store. The mapping system also permits the user mode applications to communicate with the individual ACPI-compliant devices. This permits user applications, for example, to modify values that were previously available only through the BIOS configuration program. As a result, the security afforded by the BIOS configuration program is compromised and protection of the BIOS settings becomes an operating system security issue.

For example, a user may unwittingly download and execute a script that is maliciously designed to alter the BIOS settings. Changes in the BIOS can result in physical harm to the computer, data becoming unavailable, or even rendering the computer unbootable and the BIOS not readily correctable. Security of the BIOS and the computer system is undesirably at risk for security flaws in the operating system.

Operating system access control parameters and a protected function are introduced to protect the configuration settings from unauthorized operating system access. The computer apparatus thus includes a processor for executing instructions including a plurality of instructions forming the operating system. A first nonvolatile memory (170) stores a plurality of configuration settings including at least one operating system access control parameter. A second nonvolatile memory (180) stores a protected function external to the operating system. The protected function instructs the processor to execute an operating system request to access the configuration settings in accordance with an authorization determined by the at least one operating system access control parameter.

Figure 2:
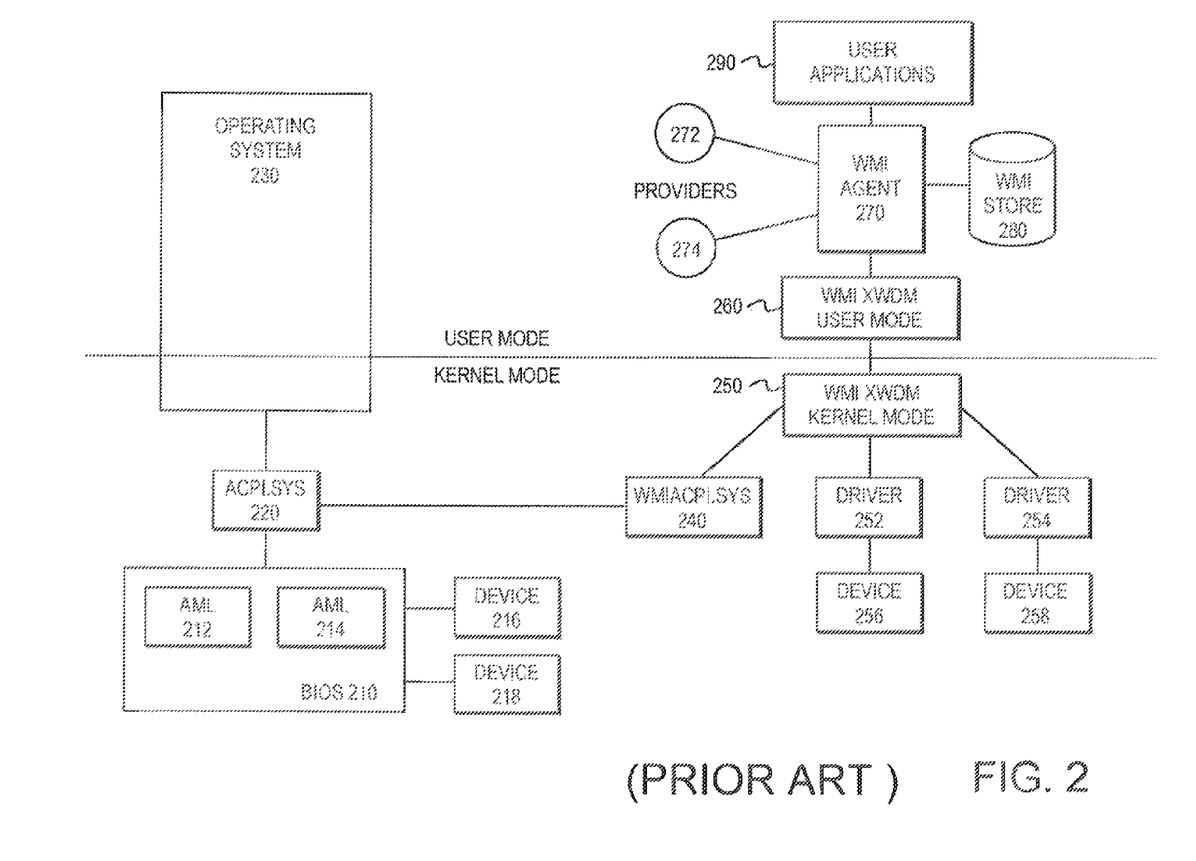
FIG. 2 illustrates one embodiment of Windows Management Instrumentation and Advanced Control and Power Interface architectures.

FIG. 2 illustrates one embodiment of the ACPI architecture in conjunction with the Windows Management Instrumentation (WMI) architecture developed by Microsoft Corporation. The user applications 290 are executing at a user mode privilege level of the operating system. A WMI agent 270 maintains and provides access to a WMI store 280. The WMI store 280 is a database containing the ACPI device information that is exposed to or otherwise accessible by the user applications through the WMI agent 270.

The information in the WMI store 270 comes from multiple WMI providers 272, 274, 260. The WMI providers provide an interface between the WMI agent 270 and one more "managed" objects. For example, when the WMI agent receives a request from a user application for information that is not available in the WMI store, it forwards the request to the appropriate WMI provider. The WMI provider then supplies the information requested.

The WMI Extensions to Windows Driver Model (XWDM) user mode 260 and the WMI XWDM kernel mode 250 are providers that cooperate and serve as a tunnel between the user and kernel modes to permit instrumented devices to make information available to the user applications.

Within the kernel mode privilege side, drivers 252, 254 support their associated devices 256, 258 and pass information to the WMI agent through the XWDM collective providers. This permits user applications 290 to read or modify information within the devices 256, 258. In addition to reading or setting specific information within the devices, "method calls" similar to an I/O control call are also supported.

Microsoft Windows-brand operating systems accomplish the ACPI-to-WMI mapping using two drivers: ACPI.sys 220, and WMIACPI.sys 240. WMIACPI.sys 240 is a mapping driver designed specifically to interface with the subset of the components that form the ACPI system. Devices 216, 218 provide information to the operating system using the ACPI driver 220 and the AML code stored with BIOS 210. The operating system 230 controls the power usage of the devices 216, 218 by issuing commands to ACPI driver 220 to read or modify parameters controlling the operational state of the devices 216, 218.

The user applications 290 issue WMI/WBEM commands. The mapping driver 240 links a WMI/WBEM command to an ACPI method. The ACPI method is then executed through the ACPI driver 220 (ACPI.sys).

ACPI compliant systems utilize tables in the BIOS to describe interfaces to the devices. The tables use a pseudo-code language that is interpreted by an ACPI machine language (AML) interpreter component of the operating system. In order to identify ACPI devices that might be instrumented, the ACPI mapping driver queries the ACPI driver for a list of data block, event, and method globally unique identifiers ("GUIDs") supported by the AML code within the ACPI descriptor tables managed by the ACPI driver. The ACPI mapping driver maps the GUIDs to control method IDs such that the GUIDs (and thus the devices) are registered with the instrumentation system.

WMI is one software vendor's implementation of the WBEM initiative. WMI is a Common Information Model (CIM) compliant specification. The CIM is a conceptual model that uses object oriented paradigms to provide a consistent description and structure for data. Elements of CIM include object instances, classes, properties, references, methods, and associations. The language used to define CIM elements is referred to as Managed Object Format (MOF).

Further information regarding CIM may be found in the Common Information Model (CIM) Infrastructure Specification v. 2.3 (Aug. 11, 2004) and the CIM Schema v. 2.8.2 (October 2004). WBEM documentation and the CIM specifications are managed by an industry association named Distributed Management Task Force, Inc.

An ACPI pseudo-device may be defined for accessing BIOS settings. To signal that a device is WMI-accessible, an ACPI compatible system defines one or more devices in the ACPI device tree with a specific Plug and Play ID defined by the mapping driver. This Plug and Play ID is the ID assigned for ACPI-to-WMI mapping and indicates that the device is to be instrumented and mapped through WMI. In one embodiment, the Plug and Play ID has a value of "PNP0C14".

The WMI-accessible device is further described using the AML pseudo-code and a Managed Object Format file (MOF). The WMIAPCI.sys driver invokes the ACPI.sys driver to execute the BIOS AML code for a particular device. The MOF file may be part of the BIOS (i.e., within the nonvolatile memory storing the BIOS) or located on a peripheral device (e.g., a hard drive). Each computer system or BIOS vendor can differentiate the specifics of accessing their respective BIOS settings through the use of a MOF file. In various embodiments, the MOF file may be included within the BIOS (e.g., as part of the AML or ACPI code) or located on a storage medium (e.g., hard drive) other than the nonvolatile memory containing the BIOS. The control methods, properties, etc. for accessing the BIOS particular to a given vendor may be set forth in the MOF file.

The operating system is "made aware" of the ability to access the BIOS configuration settings as a result of the AML code and MOF file loaded during the pre-OS boot phase. The BIOS access control methods ultimately invoke BIOS functions to access the configuration setting parameters.

Figure 3:
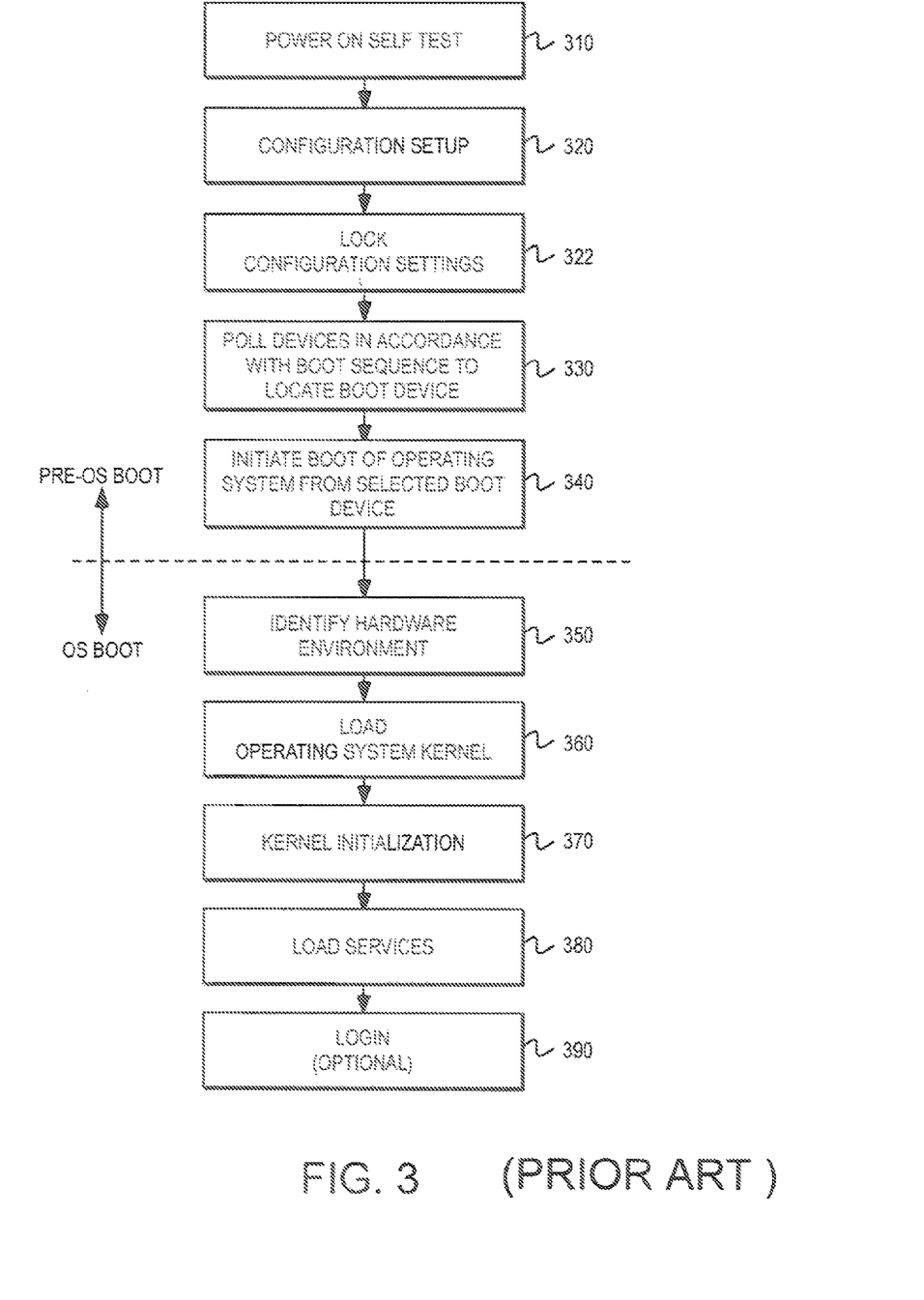
FIG. 3 illustrates one embodiment of a computer boot process.

FIG. 3 illustrates one embodiment of a computer boot process. Upon initialization, the processor starts executing the BIOS code stored in the boot nonvolatile memory. The BIOS includes instructions for performing a Power On Self Test (POST) as indicated in step 310.

After a successful POST, a window of opportunity for optionally invoking a pre-OS boot BIOS configuration program is available in step 320. Unless the user issues a keyboard key sequence during this window of opportunity to launch the configuration program, the computer will proceed to boot the operating system. The specific key sequence for the configuration program is dependent upon the vendor of the computer's BIOS. Common key sequences include the DEL key, SHIFT-DEL key combination, F-10 key, etc.

At some point prior to booting the operating system, the nonvolatile memory storing the configuration settings is "locked" to prevent unauthorized access as indicated by step 322. Locking may be achieved, for example, by ensuring that the configuration settings are stored in nonvolatile memory locations that the BIOS does not make available to the operating system. The area of nonvolatile memory that the configuration settings are stored in is not exposed or otherwise made available to direct manipulation or access by the operating system. The operating system is expected to use BIOS function calls in order to ensure authorized accesses to the configuration settings.

The BIOS polls peripheral devices in accordance with a peripheral device boot sequence to locate a boot device in step 330. Step 340 initiates an operating system boot from the boot device. The selected boot device is the first peripheral device in the peripheral device boot sequence that has a valid boot sector indicative of the presence of an operating system. The BIOS transfers control to code located within the boot sector of the selected boot device. The boot sector code is operating system- and file system-specific. The BIOS, however, is still used to access the boot device. Steps 310-340 are referred to as a "pre-OS" boot phase.

In step 350, a hardware environment is detected. Information regarding the computer architecture is collected. The operating system kernel is loaded in step 360. In step 370, the kernel is initialized using the information gathered in step 350. Different peripherals, for example, may require distinct drivers to communicate with the operating system. The information gathered in step 350 aids in the determination of the appropriate drivers to be used by the kernel. In step 380, various services utilized by the operating system (e.g., user authorization) may be loaded. The computer then optionally provides a login authorization in step 390 before permitting access by users. Typically, the operating system is considered to have successfully booted once the user is able to successfully perform a login.

Steps 350-390 are referred to as the "OS boot" phase of the boot process. Steps 350-390 are intended to represent a generic operating system boot process. The process may vary depending upon the specifics of the operating system being loaded. For example, some operating systems may be deemed successfully booted prior to a successful user login.

Figure 4:
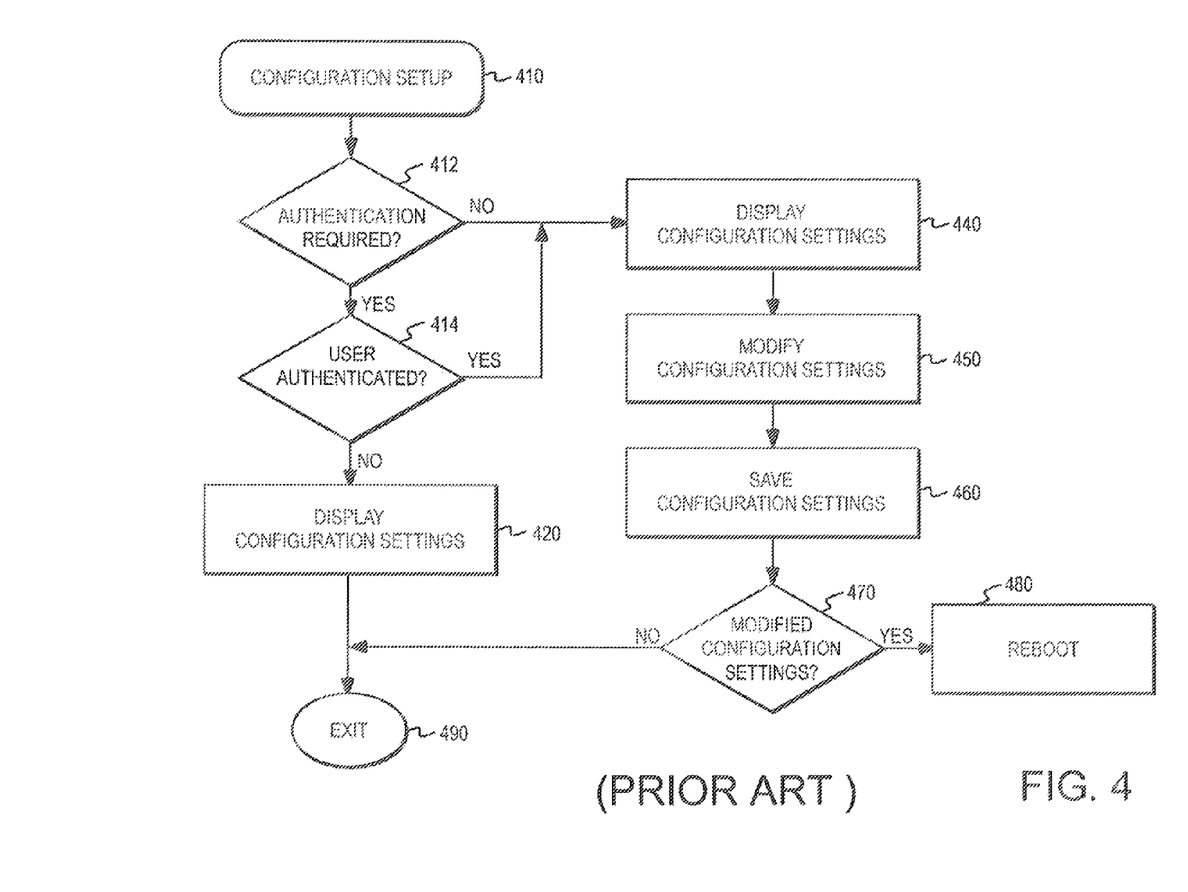
FIG. 4 illustrates one embodiment of a method for modifying configuration settings during a pre-OS boot execution environment.

FIG. 4 illustrates one embodiment of the pre-OS boot configuration settings process (step 320 of FIG. 3) beginning with step 410. If the user has previously set a password for the BIOS configuration program, then user authentication will be required as indicated by step 412.

If authentication is required and the user is unable to be authenticated as determined by step 414, user access may be limited to read-only configuration settings information without the ability to modify any of the configuration settings. Thus the configuration settings may be displayed as indicated by step 420 but not modified. In alternative embodiments, an unauthenticated user may be prohibited even from reading the configuration settings. The configuration program is then exited in step 490.

If no authentication is required, or alternatively, user authentication is required and the user enters the correct password for authentication, then the configuration program will permit both read access and write access to the nonvolatile memory storing the configuration settings. Thus configuration settings may be displayed in step 440. Desired modifications may be made in step 450. The modifications are saved in step 460. If modifications to the settings have been made, as determined by step 470, then the computer is typically rebooted in step 480. Otherwise, if no modifications have been made, then the process exits in step 490.

Referring to FIG. 3, the area of nonvolatile memory will be locked by the BIOS prior to transferring control to the operating system as indicated in step 322. Typically, the boot process will not reach this step until the user either avoids invoking the configuration program or otherwise avoids changing any configuration settings such that the reboot step 480 of FIG. 4 is avoided.

The settings or parameters that may be altered by the configuration program are pertinent to operation of the computer. For example, the configuration program might permit modification of clock speed, alarm thresholds, memory configurations, processor or system features, etc. In one embodiment, one or more "operating system access control parameters" are used to permit limitations on operating system access (through the BIOS). The configuration program permits an authorized user to define the level of access and authorization required for operating system access to the configuration information.

Figure 5:
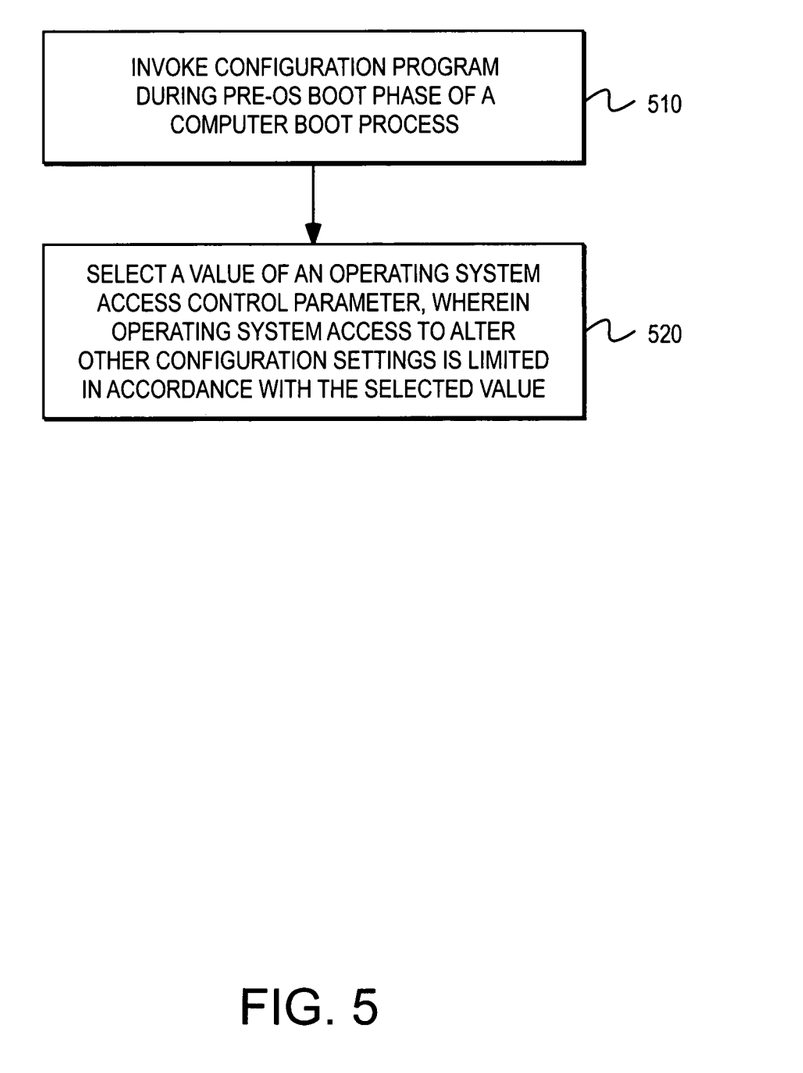
FIG. 5 illustrates one embodiment of a process for selecting a value for an operating system access control parameter during a pre-OS boot phase of a computer boot process.

FIG. 5 illustrates one embodiment of a process for controlling operating system access rights to configuration settings stored in nonvolatile memory such as a semiconductor nonvolatile memory. In step 510, the configuration program is invoked during a pre-OS boot phase of a computer boot process. The value of an operating system access control parameter is set in step 520. The value of the parameter limits operating system access to alter or modify other configuration settings or parameters through the BIOS. In one embodiment, the BIOS checks the status of the operating system access control parameter prior to responding to an operating system request to access any configuration settings.

Figure 6:
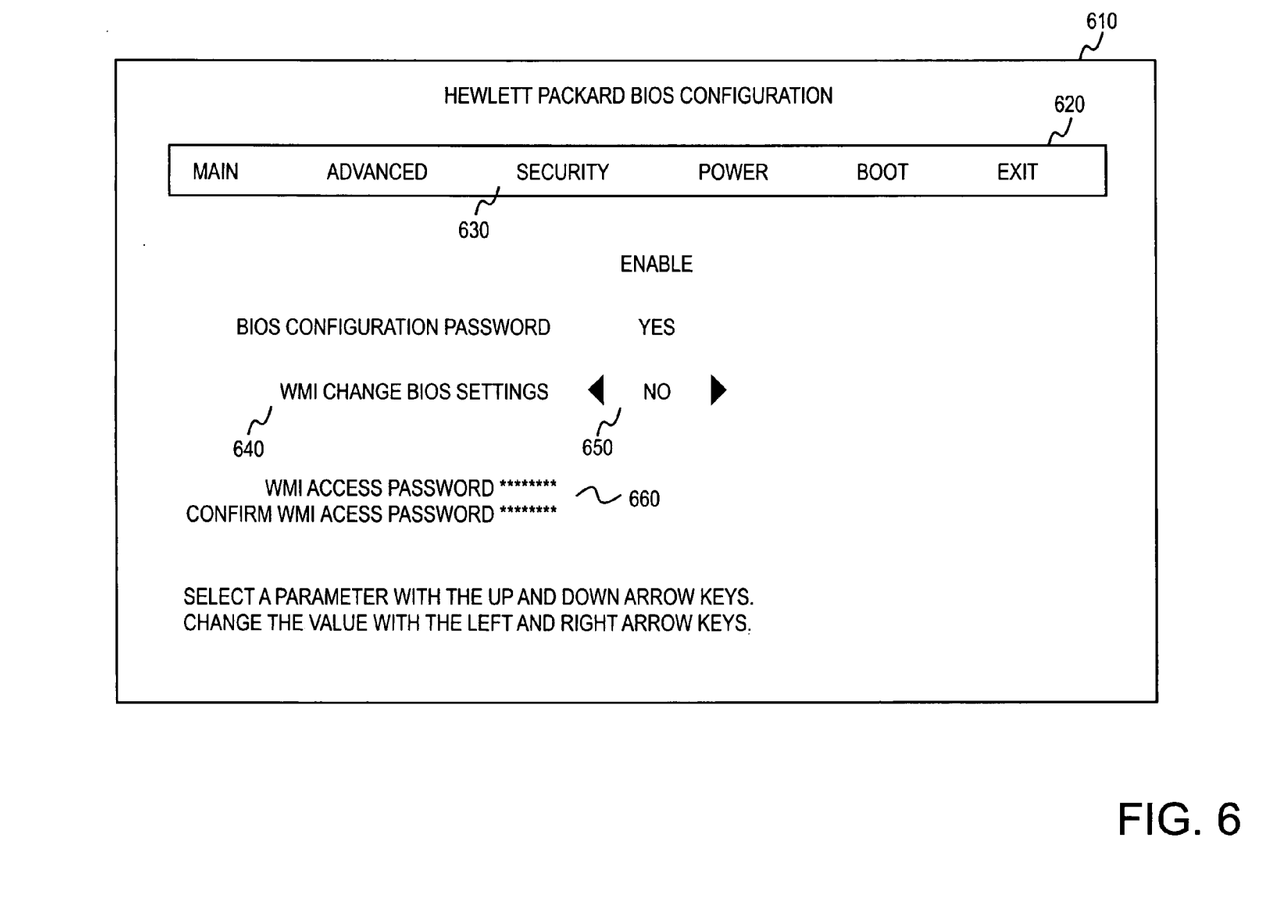
FIG. 6 illustrates one embodiment of a display screen for selecting the value(s) of an operating system access control parameter.

FIG. 6 illustrates one embodiment of a configuration settings display 610 provided by the configuration program for controlling operating system access rights to the configuration settings. A menu bar 620 includes a number of selectable categories of settings or actions. A grayed menu item (e.g., "security" 630) indicates the currently selected category. User modifiable parameters associated with the selected category are highlighted when selected. In the illustrated embodiment, "WMI CHANGE BIOS SETTINGS" 640 is the description of the parameter that determines the operating system access rights to the nonvolatile memory storing the BIOS configuration settings. The value 650 associated with the parameter is similarly highlighted. In one embodiment, the parameter value is selected from a list of parameter values including YES and NO.

A value of NO limits the operating system to read-only access of the nonvolatile memory storing the configuration settings. Thus the operating system may determine a setting or parameter value such as the current processor clock speed, however, the user will not be permitted to modify the clock speed through the operating system.

A value of YES provides the operating system with read and write access to the nonvolatile memory. (The term "write" is considered equivalent to "modify" in the sense that current parameter values may be modified, however, the operating system cannot create new configuration parameters). In one embodiment, a secondary operating system access password option is provided to limit the operating system to read-only access unless the operating system access is authenticated by a password defined by the WMI ACCESS PASSWORD 660. Leaving this field blank permits operating system write access without password authentication.

In one embodiment, only a proper subset of the parameters modifiable through a configuration program during a pre-OS boot phase are subsequently modifiable through the operating system. Thus in one embodiment, the authentication password established during a pre-OS boot phase cannot subsequently be modified by the operating system regardless of the access permitted for the remaining configuration settings.

The computer does not rely upon the operating system to observe the limitations established by the operating system access control parameter. In one embodiment, the operating system does not have direct access to the configuration settings. In one embodiment, the operating system is forced to use a protected function to request access to the configuration settings. In one embodiment, the protected function is a BIOS function embodied as a set of processor executable instructions external to the operating system. The protected function is not readily subjected to erasure or modification. The protected function may be stored within a nonvolatile semiconductor memory. The protected function enforces the access rights established by the value of the operating system access control parameter(s).

Figure 7:
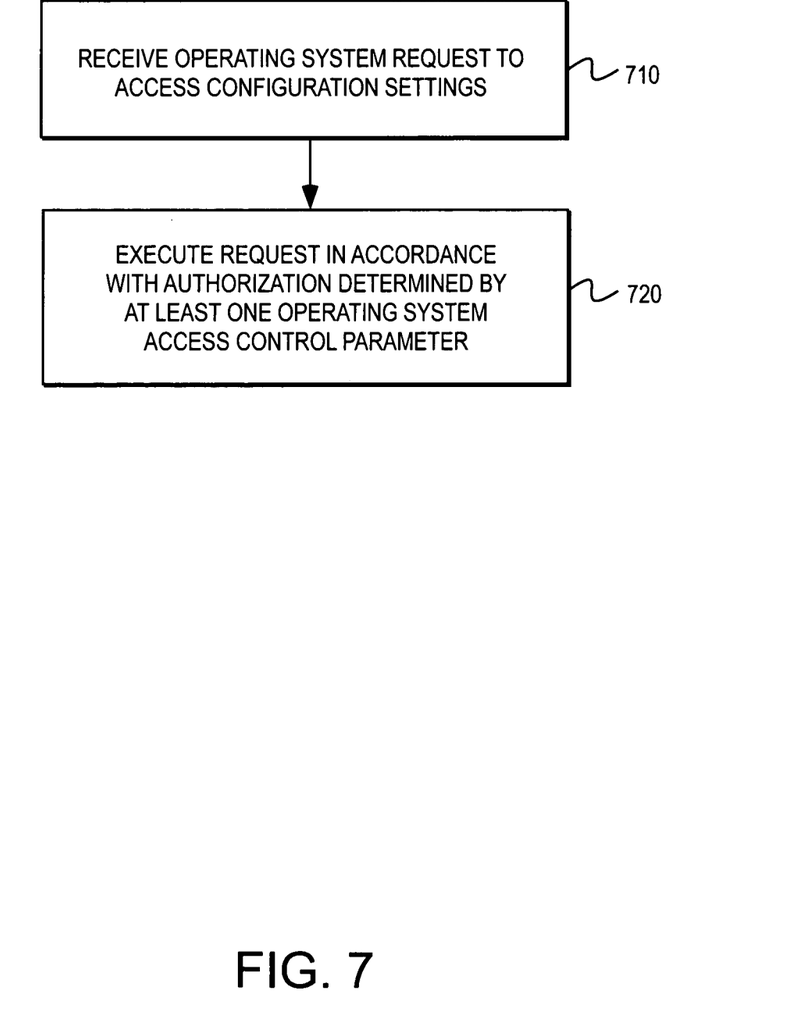
FIG. 7 illustrates one embodiment of a method of handling an operating system request to access the configuration settings.

FIG. 7 illustrates one embodiment of process for handling an OS request to access configuration settings. An operating system request to access the configuration settings is received in step 710. The operating system, for example, may call a protected function such as a BIOS function with a request to access the configuration settings. The request is executed in accordance with an authorization determined by at least one operating system access control parameter in step 720. Generally, the value of the one or more operating system access control parameter(s) can authorize access rights including read and write access rights for the configuration settings either individually or in one or more groups.

In one embodiment, the operating system access control parameter(s) may enable/disable all access for all modifiable configuration settings. Thus for example, all access rights are prohibited if the operating system access control parameters are chosen to disable protection. Alternatively, all possible access rights (e.g., read and write) are granted if the operating system is properly authorized. In either case, the same authorization and access rights applies to all modifiable configuration settings.

In many environments, write access is assumed to automatically include read access. However distinct enabling/disabling of access rights can be implemented in one embodiment. Thus, for example, the authorization for read access may be distinct from the authorization for write access. Thus the operating system may be authorized for a first type of access to the configuration settings independently of authorization for a second type of access to the same configuration settings. The operating system access control parameter(s) are thus configurable to provide one authorization for a first access right (e.g., read) and a second authorization for a second access right (e.g., write).

In one embodiment, the operating system access control parameter(s) may enable/disable all access rights distinctly for different groups of one or more configuration settings. Thus all access rights may be authorized for one group of configuration settings and prohibited for a different group of configuration settings. This would permit the operating system to have all access rights (e.g., reading and writing) for a peripheral device boot sequence while prohibiting any operating system access to the WMI access password. The operating system access control parameter(s) are configurable to authorize all access rights to a first group of configuration settings distinctly from an authorization of all access rights to a second group of configuration settings.

Finally, the operating system access control parameter(s) may enable/disable access rights independently of each other for distinct groups of configuration settings. This would permit a user, for example, to enable the operating system to have read and write access to one group of configuration settings, read only access to another group of configuration settings, and no access to yet another group of configuration settings. The operating system access control parameter(s) are configurable to authorize access rights for a first group of configuration settings distinctly from an authorization of access rights for a second group of configuration settings such that each group may have a different authorization requirement. Although each configuration setting within a selected group has the same set of access rights, the access rights are selected independently from each other.

Operating system authorization may be determined by any number of techniques. For example, the identity of the specific user (i.e., specific authorization by username), or the group that the user belongs to (e.g., administrator group) may be used for authorization. Alternatively, either the operating system or the BIOS function may provide the requestor with an opportunity to enter a password to be presented to the BIOS function for determining authorization.

Figure 8:
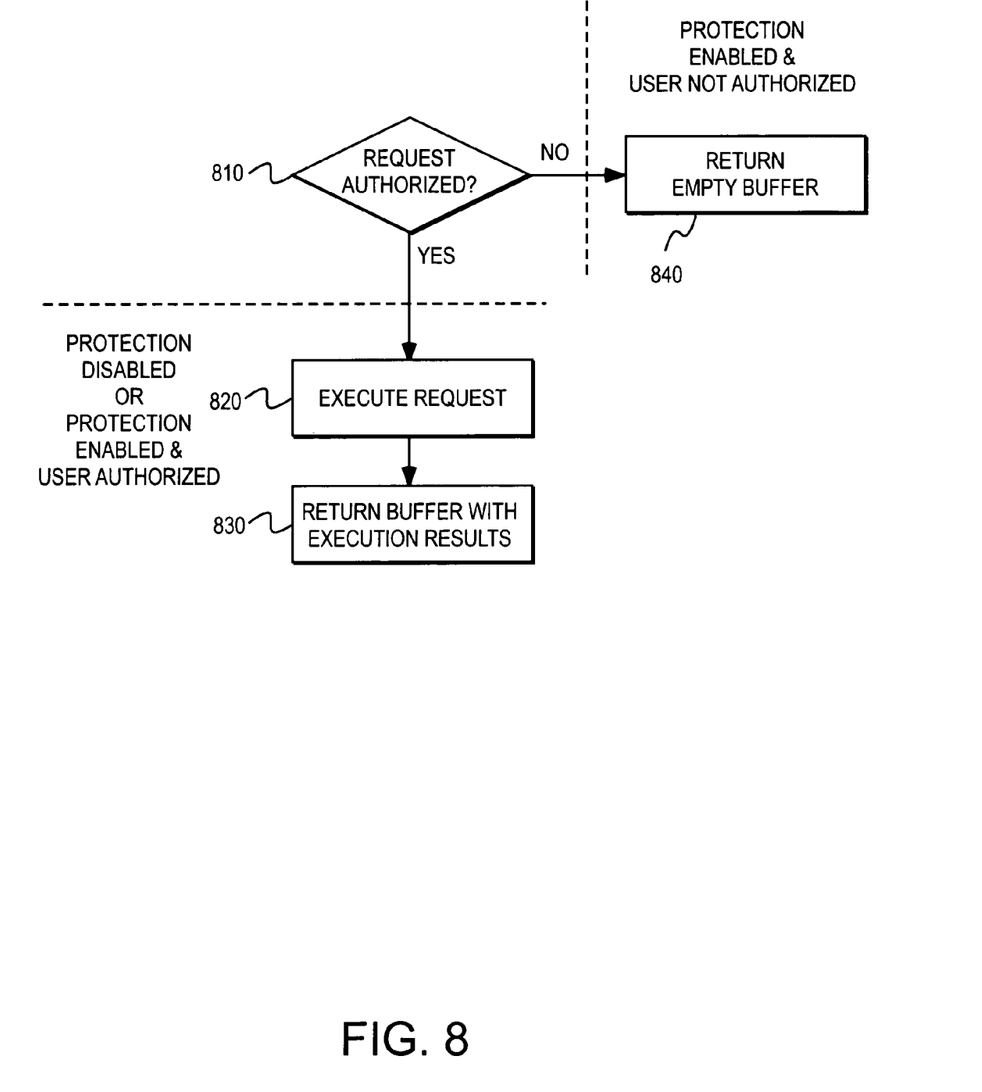
FIG. 8 illustrates one embodiment of a method for executing an operating system request to access the configuration settings.

FIG. 8 illustrates one embodiment of a method for executing the configuration setting access request in accordance with the authorization determined by the at least one operating system access control parameter. If the request is not authorized as determined by step 810, then an empty buffer is returned in response to the request in step 840. This would occur, for example, if WMI access was disabled in the BIOS configuration utility (i.e., WMI CHANGE BIOS SETTINGS is set to NO).

If step 810 determines that the request is authorized, then the request is executed in step 820. The request is authorized if either: i) protection is enabled and the user is deemed authorized by the standards used for authorization; or ii) protection is disabled. Disabling/enabling of protection and the type or level of authorization required may all be controlled by the value(s) selected for the one or more operating system access control parameter(s) with the configuration program utilized in the pre-OS boot phase.

After executing the request, a buffer with the execution results is returned in step 830. The execution results, for example, may contain confirmation of a modification to a setting (for a write operation) or the value of the parameters inquired about (for a read operation).

Figure 9:
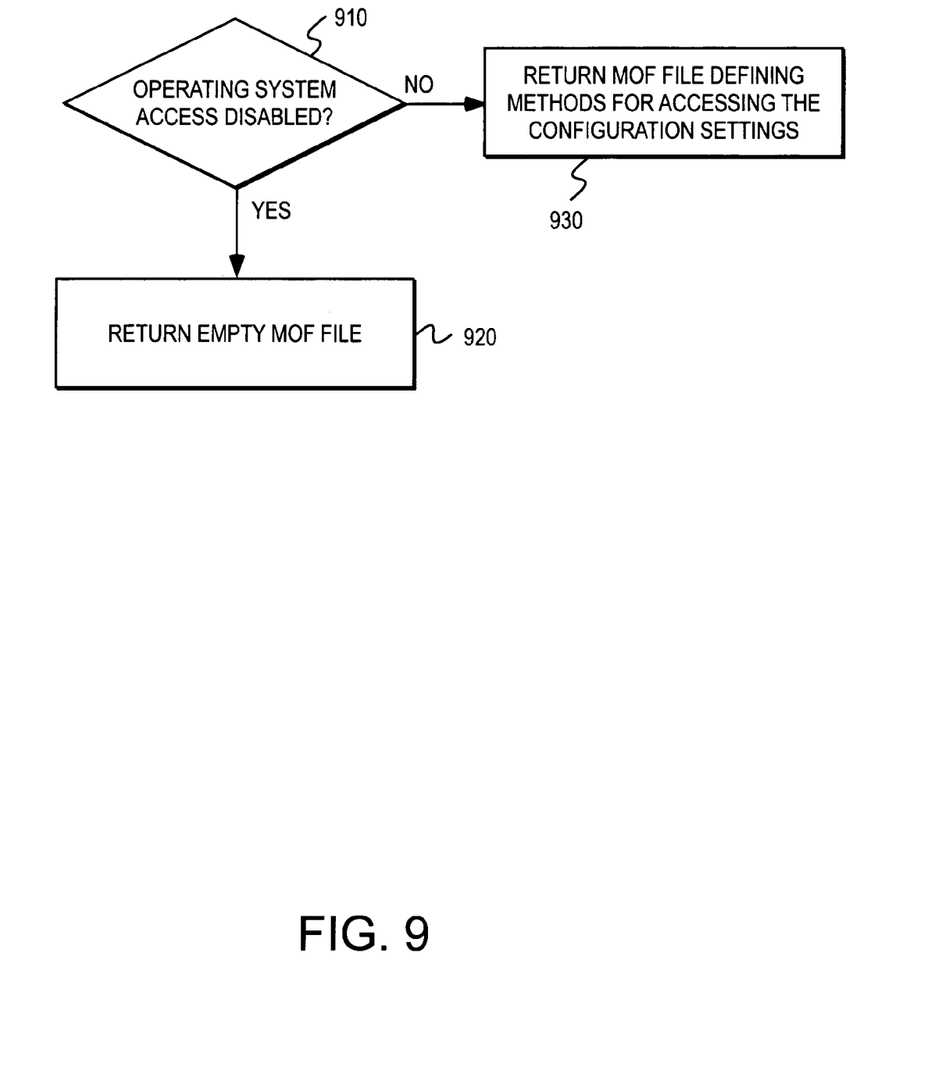
FIG. 9 illustrates an embodiment of a method for disabling operating system access to the configuration settings.

FIG. 9 illustrates an alternative embodiment of a method for disabling operating system access to the configuration settings. The content of the MOF file provided during the pre-OS boot phase is dependent upon the operating system access control parameter. Without the proper MOF file, the operating system cannot subsequently call the appropriate methods for accessing the configuration settings.

Step 910 determines whether an operating system access to the configuration settings is to be disabled in accordance with an operating system access control parameter. If so, then an empty MOF file is provided in step 920. Otherwise, the MOF file that appropriately defines the methods for accessing the configuration settings is provided in step 930. Thus one of a first and a second MOF file is selected in accordance with a value of the operating system access parameter. The selected MOF file properly identifies the methods necessary for accessing the configuration settings, if operating system access is not wholly disabled. The selected MOF file may be empty, if the operating system access control parameter indicates that operating system to the configuration settings is disabled. Steps 910-930 are performed during the pre-OS boot phase of the computer boot process.

In the preceding detailed description, the invention is described with reference to specific exemplary embodiments thereof. Methods and apparatus for controlling operating system access to computer configuration settings have been described. Various modifications and changes may be made thereto without departing from the broader spirit and scope of the invention as set forth in the claims. The specification and drawings are, accordingly, to be regarded in an illustrative rather than a restrictive sense.

What is claimed is:

1. A method of controlling operating system access to one or more BIOS configuration settings, comprising:
   providing a managed object format (MOF) file having content dependent upon an operating system access control parameter,
   wherein the MOF file is empty if the operating system access control parameter indicates operating system access is disabled, and
   wherein the MOF file defines methods for accessing the one or more BIOS configuration settings if the operating system access control parameter indicates operating system access is not disabled.

2. The method of claim 1 wherein both MOF file contents are stored within a nonvolatile semiconductor memory.

* * * * *